United States Patent
Cristini

(10) Patent No.: US 11,613,847 B2
(45) Date of Patent: Mar. 28, 2023

(54) CLEANING SYSTEM AND METHOD FOR CLEANING A BAND CIRCULATING IN A PAPER MAKING MACHINE AND PAPER MAKING MACHINE COMPRISING SAID SYSTEM

(71) Applicant: S.A. GIUSEPPE CRISTINI S.p.A., Milan (IT)

(72) Inventor: Giovanni Cristini, Marone (IT)

(73) Assignee: S.A. GIUSEPPE CRISTINI S.P.A., Milan (IT)

( * ) Notice: Subject to any disclaimer, the term of this patent is extended or adjusted under 35 U.S.C. 154(b) by 408 days.

(21) Appl. No.: 16/706,031

(22) Filed: Dec. 6, 2019

(65) Prior Publication Data
US 2020/0179989 A1  Jun. 11, 2020

(30) Foreign Application Priority Data
Dec. 6, 2018  (IT) .................. 102018000010875

(51) Int. Cl.
  *D21F 1/32* (2006.01)
  *D21G 9/00* (2006.01)
  *G05D 22/02* (2006.01)

(52) U.S. Cl.
  CPC ........... *D21F 1/325* (2013.01); *D21G 9/0009* (2013.01); *G05D 22/02* (2013.01)

(58) Field of Classification Search
  CPC . D21F 1/325; D21F 1/32; D21F 1/345; D21F 1/34; D21G 9/0009; G05D 22/02
  USPC .................................. 162/198, 199, 263, 274
  See application file for complete search history.

(56) References Cited

U.S. PATENT DOCUMENTS 6,143,092 A  11/2000 Straub et al.
2002/0129914 A1* 9/2002 Grabscheid ............. D21F 1/325
  162/903

FOREIGN PATENT DOCUMENTS

DE  10 2011 006 135 A1 * 9/2012 ............. D21F 1/325
DE  20 2011 110365     9/2013
EP  0 383 486          8/1990
EP  0 383 486 A2 *     8/1990 ............. D21F 1/325
EP  0 867 559          9/1998
EP  1 225 270          7/2002
WO  WO 2015/097682    7/2015

OTHER PUBLICATIONS

DE 10 2011 006 135 A1, English language machine translation [epo.org], (Year: 2012).*

* cited by examiner

*Primary Examiner* — Eric Hug
(74) *Attorney, Agent, or Firm* — Leason Ellis LLP

(57) ABSTRACT

A cleaning system for cleaning a band circulating in a paper making machine; the system comprising:
at least one detecting device configured to detect at least one parameter indicative of the cleaning conditions of the band on at least one portion of the band;
at least one cleaning device provided with at least one nozzle to create a jet of a cleaning fluid; the nozzle being arranged so that the jet of cleaning fluid is directed towards the band;
a control device configured to regulate the cleaning device on the basis of the at least one parameter indicative of the cleaning of the band.

13 Claims, 4 Drawing Sheets

CLEANING SYSTEM AND METHOD FOR CLEANING A BAND CIRCULATING IN A PAPER MAKING MACHINE AND PAPER MAKING MACHINE COMPRISING SAID SYSTEM

CROSS-REFERENCE TO RELATED APPLICATIONS

This Patent Application claims priority from Italian Patent Application No. 102018000010875 filed on Dec. 6, 2018, the entire disclosure of which is incorporated herein by reference.

TECHNICAL FIELD

The present invention concerns a cleaning system and method for cleaning a band circulating in a paper making machine. The present invention furthermore concerns a paper making machine comprising said system.

BACKGROUND ART

As is known, in traditional paper making machines bands (commonly called felts) are used circulating along closed-loop paths and by means of which the paper material being formed is transported and processed. Each section of the machine generally has a specific type of band.

To obtain good quality paper it is important to maintain appropriate conditions of the band circulating in each section. It is therefore important for the band to have given characteristics to obtain high quality paper.

Often the bands become dirty during use and consequently the conditions of the band, in terms of water absorption, transport of the water and permeability to the water vary abruptly, compromising the paper formation process.

Normally the bands are cleaned by means of at least one washing device, configured to spray water at an appropriate pressure onto the band.

However, the washing of the bands by means of the washing devices of known type is not controlled and does not differentiate the washing intensity. This entails obvious drawbacks. In fact, the band clogging process is often not uniform.

Insufficient cleaning of the band results in poor drainage of the band, whereas an excessive cleaning of the band, in the long term, causes wear on the band, compromising its life. Above all, the absence of washing control entails obvious waste in terms of energy and water.

DISCLOSURE OF INVENTION

An object of the present invention is therefore to provide a cleaning system for cleaning a band circulating in a paper making machine which is without the drawbacks of the known art highlighted here; in particular, an object of the invention is to provide a cleaning system that overcomes the above-mentioned drawbacks in a simple and inexpensive manner, in both functional and construction terms.

In accordance with said objects, the present invention concerns a cleaning system for cleaning a band circulating in a paper making machine; the system comprising:

at least one detecting device configured to detect at least a parameter indicative of the cleaning conditions of the band on at least one portion of the band; at least one cleaning device provided with at least one nozzle to generate a jet of cleaning fluid; the nozzle being arranged so that the jet of water is directed towards the band;

a control device configured to regulate the cleaning device based on the at least one parameter indicative of the cleaning conditions of the band.

Advantageously, the system according to the present invention guarantees effective cleaning, minimizing the energy and water consumptions.

A further object of the invention is to provide a paper making machine in which the washing of the band can be carried out in a simple and reliable manner, at the same time guaranteeing low water and energy consumptions.

In accordance with said objects, the present invention concerns a paper making machine comprising at least one band circulating along a circulation direction and at least one cleaning system for cleaning a band as described above.

A further object of the invention is to provide a cleaning method for cleaning a band circulating in a paper making machine by means of which the washing of the band can be carried out in a simple and reliable manner, at the same time guaranteeing low water and energy consumptions. In accordance with said objects the present invention concerns a cleaning method for cleaning a band in a paper making machine as claimed in claim 18.

BRIEF DESCRIPTION OF THE DRAWINGS

Further characteristics and advantages of the present invention will appear clear from the following description of a non-limiting embodiment example thereof, with reference to the figures of the annexed drawings, in which.

BEST MODE FOR CARRYING OUT THE INVENTION

Figure 1:
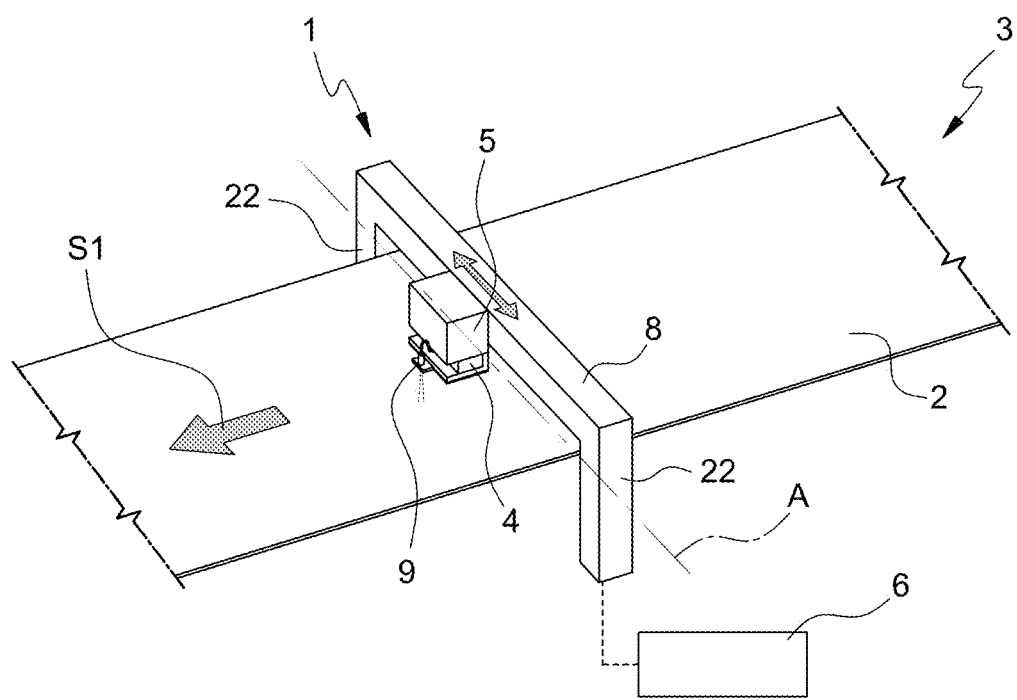
FIG. 1 is a schematic perspective view, with parts removed for clarity, of a portion of a paper making machine comprising a cleaning system in accordance with the present invention.

In FIG. 1, the reference number 1 indicates a cleaning system for cleaning a band 2 circulating in a paper making machine 3 according to the present invention.

FIG. 1 illustrates only one portion of the paper making machine 3. The band 2 circulates in a first circulation direction S1.

In the non-limiting example described and illustrated here, the portion of the paper making machine 3 illustrated in FIG. 1 belongs to a pressing section. It is understood that the system 1 according to the present invention can be installed also in drying sections and/or in formation sections of the paper making machine 3.

The system 1 comprises at least a detecting device 4, configured to detect at least one parameter indicative of the cleaning conditions of the band 2 on at least one portion of the band 2, at least one cleaning device 5 configured to clean the band 2, and a control device 6 configured to regulate the cleaning device 5 based on the at least one parameter indicative of the cleaning of the band 2 detected by the detecting device 4.

The system 1 further comprises a first moving assembly 7 configured to move the detecting device 4 with respect to the band 2 and a second moving assembly 8 configured to move the cleaning device 5 with respect to the band 2.

The detecting device 4 is provided with a first detector (not illustrated) configured to detect at least one parameter indicative of the cleaning conditions of the band 2.

In the non-limiting example described and illustrated here, the detecting device 4 is provided with a first detector (not illustrated) configured to detect the permeability of the band 2. In particular, the first detector comprises at least one water delivery nozzle and a flow meter associated with the nozzle (not illustrated).

The detecting device 4 further comprises a control unit (not illustrated), connected to the first detector to process the signals coming from it and provide one or more data indicative of the cleaning of the band 2 based on the permeability values detected.

In a variation not illustrated, the detecting device 4 is also provided with a second detector configured to detect the humidity of the band 2 and the control unit is also connected to the second detector to process the signals coming from it and provide one or more data indicative of the cleaning of the band 2 based on the permeability and humidity values detected. Preferably the second detector comprises at least a microwave sensor.

In a variation not illustrated, the detecting device 4 comprises one single detector configured to detect the humidity of the band 2 and the control unit is also connected to the detector to process the signals coming from it and provide one or more data indicative of the cleaning conditions of the band 2 based on the humidity values detected.

Preferably, the detecting device 4 is supplied with water by means of a water supply duct (not visible in the attached figures) and is provided with a battery electrical power supply. A variation provides for connection to the electrical power supply network by means of a cable.

In a further variation, not illustrated, the control unit is arranged remotely and communication between the control unit and the detectors of the detecting device 4 takes place by means of cable or wireless communication systems.

It is understood that the detecting device 4 can detect other parameters indicative of the cleaning conditions of the band 2.

With reference to FIGS. 1, 2, 5 and 6, the detecting device 4 is schematically represented as a case inside which the first detector and the control unit are housed. It is understood that the detecting device 4 can have a different configuration.

The cleaning device 5 is provided with at least one nozzle 9 for generating a jet of cleaning fluid, which is arranged, in use, so that the jet of cleaning fluid emitted from the nozzle 9 is directed towards the band 2.

The cleaning fluid is preferably pressurized water.

In accordance with a variation, the cleaning fluid can be a mixture having a specific chemical composition (for example, basic, acid, solvent, etc). The mixture can also be water-based.

The nozzle 9 is schematically shown in the attached figures and is preferably defined by a terminal having a diameter smaller than the diameter of the tube to which it is coupled. In this way, the flow of water passes from the larger diameter to the smaller one.

The pressure and flowrate of the jet of water can be regulated.

According to a variation not illustrated, the nozzle 9 of the cleaning device 5 can oscillate in a controlled manner.

The cleaning device 5 can also comprise different nozzles arranged in configurations such as to locally increase the cleaning action or to carry out a distributed cleaning action. For example, the cleaning device 5 can comprise nozzles of different geometries and having different inclinations with respect to the band 2.

Figure 7:
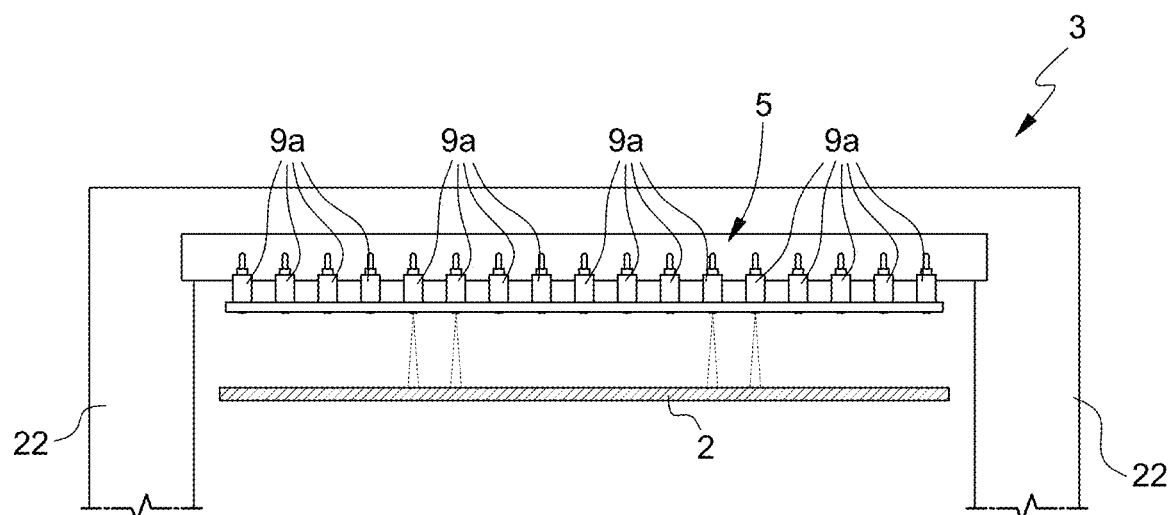
FIG. 7 is a frontal schematic view, with parts removed for clarity, of a portion of a paper making machine comprising a cleaning system in accordance with a first variation of the present invention.

In FIG. 7, for example, a variation of the cleaning device 5 is shown, which comprises a plurality of nozzles 9 side-by-side in a direction orthogonal to the circulation direction S1 of the band 2 and distributed throughout the width of the band 2. Also in this case, according to a variation, the nozzles 9 can oscillate in a controlled manner, preferably in a direction transversal to the circulation direction S1 of the band 2. In accordance with a further variation not illustrated, the nozzles 9 can carry out contained and controlled movements in a direction transversal to the circulation direction S1 of the band 2.

The cleaning device 5 is supplied with the cleaning fluid by means of a supply duct (not visible in the attached figures) and is provided with a battery electric power supply. According to a variation, it is connected to the electric power supply network by means of a cable.

With reference to FIGS. 1, 2, 5 and 6, the cleaning device 5 is schematically shown as a case provided with one single nozzle 9. It is understood that the cleaning device can have a different configuration.

The first moving assembly 7 is configured to move the detecting device 4 with respect to the band 2 in a direction transversal to the circulation direction S1 of the band 2. In particular, the detecting device 4 is active during the movement carried out by the first moving assembly 7. In this way, the detecting device 4 detects a plurality of parameters indicative of the cleaning of the band 2 in different portions of the band 2. In other words, the detecting device 4 moved by the first moving assembly 7 carries out a scan of the cleaning conditions of the band 2 circulating in the circulation direction S1. Normally the band 2 circulates at a speed ranging between 0.5 m/s and 40 m/s.

The band 2 normally has longitudinal areas which are dirty to varying degrees. Therefore, the scan described above and performed by the cleaning device 5 provides a sufficiently reliable indication of the actual conditions of the band 2.

The second moving assembly 8 is configured to move the cleaning device 5 with respect to the band 2 in a direction transversal to the circulation direction S1 of the band 2. The cleaning device 5 can be active or inactive during the movement performed by the second moving assembly 8.

If the cleaning device 5 is active during the movement, cleaning will be obtained along areas transversal to the circulation direction, whereas if the cleaning device 5 is firstly positioned and then activated, the cleaning will be carried out on longitudinal areas of the band 2.

The cleaning device 5 in accordance with the variation illustrated in FIG. 7 is fixed and is not associated with any moving assembly.

Figure 2:
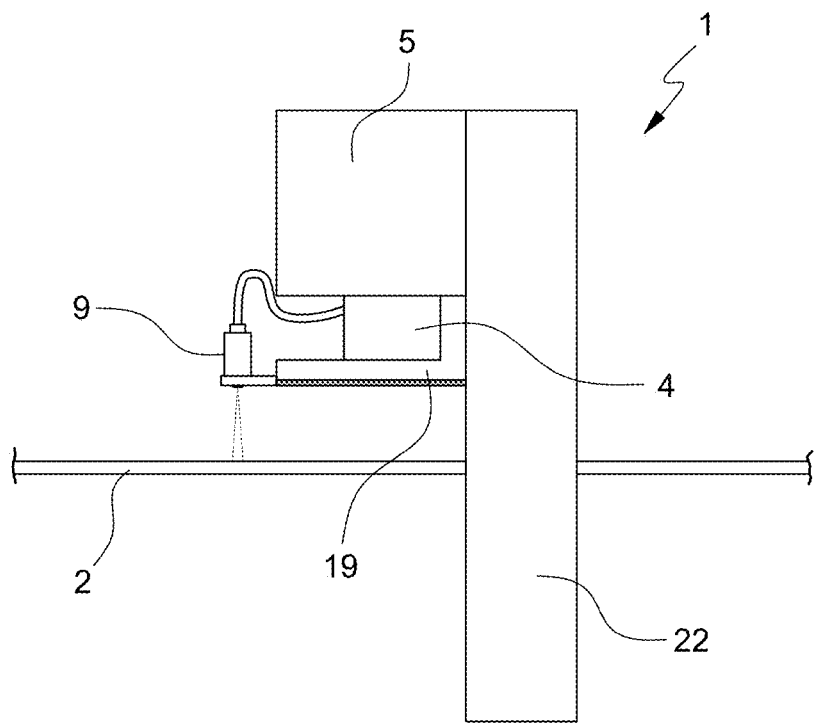
FIG. 2 is a lateral schematic view, with parts removed for clarity, of a detail of the cleaning system in accordance with the present invention.

In the example of FIGS. 1 and 2, the first moving assembly 7 coincides with the second moving assembly 8. In other words, the detecting device 4 and the cleaning device 5 are moved by a same moving assembly and perform substantially the same movements.

Figure 5:
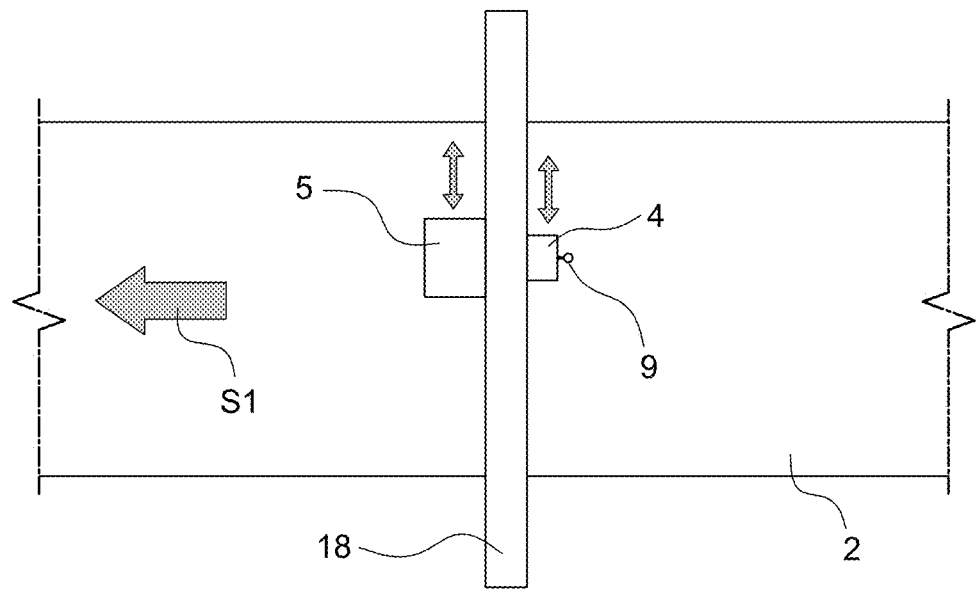
FIG. 5 is an overhead schematic view, with parts removed for clarity, of a portion of a paper making machine comprising a cleaning system according to a first variation of the present invention.
Figure 6:
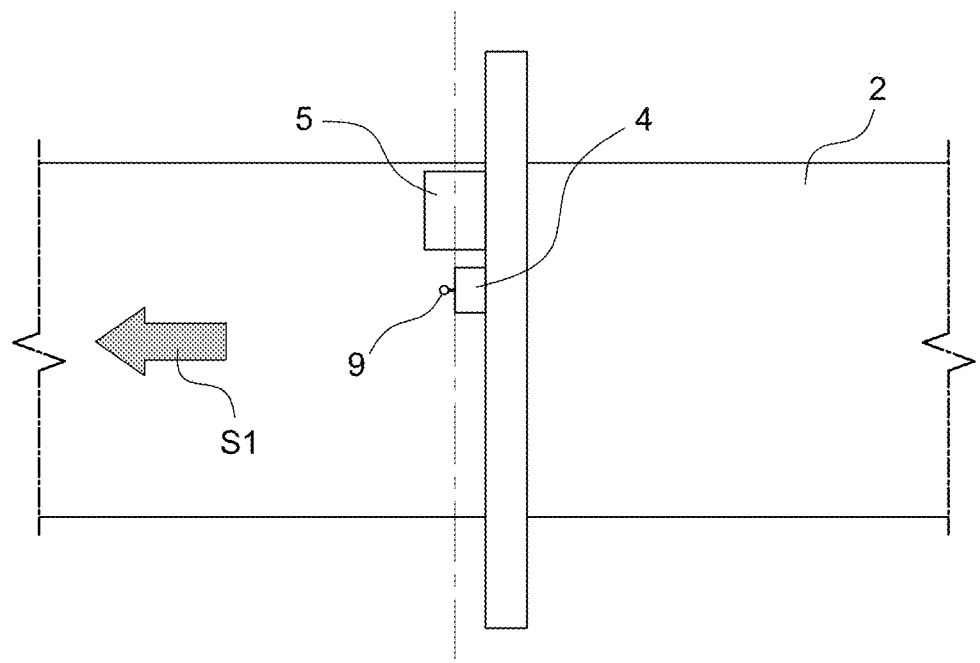
FIG. 6 is an overhead schematic view, with parts removed for clarity, of a portion of a paper making machine comprising a cleaning system in accordance with a second variation of the present invention.

FIGS. 5 and 6 illustrate two variations, which will be described in detail further on, in accordance with which the first moving assembly 7 is distinct from the second moving assembly 8. In both of the embodiments of FIGS. 5 and 6, the first moving assembly 7 and the second moving assembly 8 have a very similar structure.

Therefore, for the sake of simplicity, here and below only one moving assembly will be described.

Figure 3:
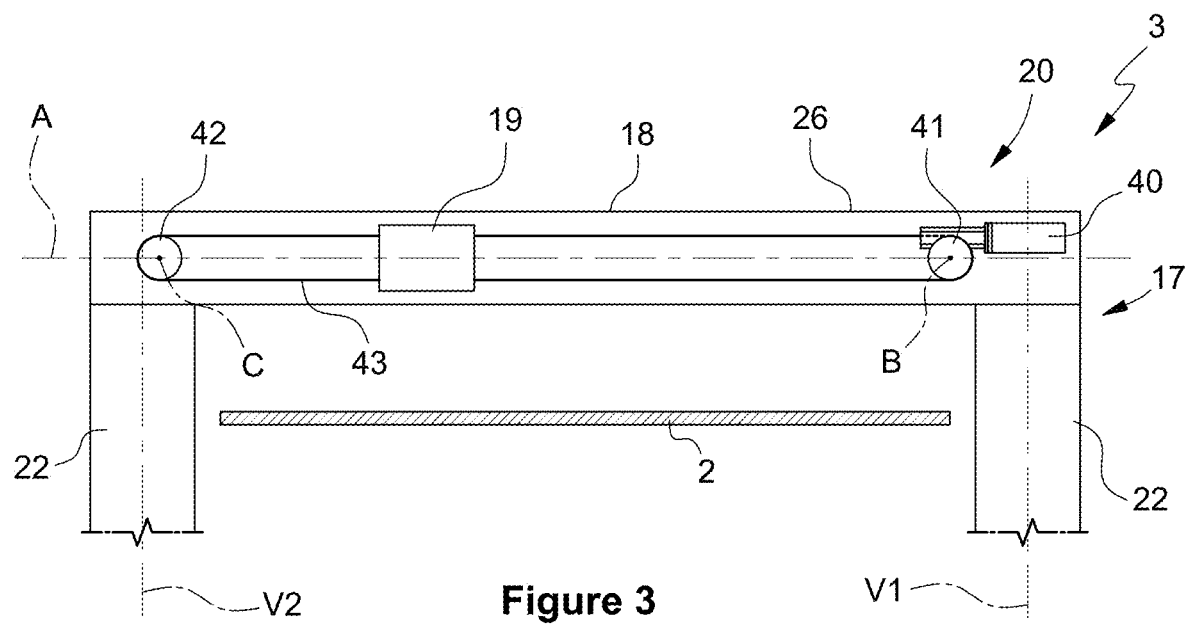
FIG. 3 is a lateral schematic view, with parts removed for clarity, of a further detail of the cleaning system in accordance with the present invention.

FIG. 3 shows schematically the moving assembly 7, 8. In FIG. 3 the cleaning device 5 and the detecting device 4 have been removed for the sake of simplicity.

The moving assembly 7 comprises a supporting frame 17, a guide 18 supported by the supporting frame 17, a carriage 19 that moves along the guide 18, and a moving device 20 configured to move the carriage 19 along the guide 18.

The supporting frame 17 comprises two substantially identical uprights 22, which are preferably arranged parallel resting on the floor or on an appropriate support base at the sides of the band 2.

Preferably the uprights 22 extend along two respective vertical axes $V_1$ and $V_2$.

The uprights 22 are preferably parallelepipedal-shaped and are coupled to the guide 18.

The uprights 22 are preferably hollow to allow for any housing of parts of the system 1.

A variation not illustrated provides for the supporting frame 17 to be a portion of the main frame normally used for supporting also other elements of the paper making machine 3.

The guide 18 extends along an axis A, orthogonal to the axes $V_1$, $V_2$ of the uprights 22 and, therefore, extends horizontally.

In other words, the guide 18 and the uprights 22 define a bridge structure.

Said solution guarantees a high safety level during the detection and scanning operations, because it prevents the operator from getting close to the moving machine.

In the non-limiting example described and illustrated here, the guide 18 is arranged above the band 2.

It is understood that the structure defined by the uprights 22 and the guide 18 can be shaped and arranged so as to be in front of the band 2, which runs substantially in an almost vertical direction.

The guide 18 comprises a guide element 26, which extends along the axis A and has a substantially C-shaped section along a plane orthogonal to the axis A. Preferably, the guide element 26 is made in one single piece. Preferably, the guide element 26 is a section bar.

The guide element 26 thus shaped defines a longitudinal seat 31.

The moving device 20 is a cable moving device comprising a drive member 40 arranged in the seat 31 near an upright 22, a drive pulley 41, a return pulley 42 arranged in the seat 31 near the other upright 22, and a traction cable 43.

The drive pulley 41 is rotatable about a rotation axis B orthogonal to the axis A and is operated by the drive member 40 connected to the drive pulley 41 by transmission means (not illustrated). The drive pulley 41 is provided with a perimeter housing seat (not shown) and configured to house the traction cable 43.

The drive member 40 is preferably a stepper motor. The return pulley 42 is rotatable about an axis C, has a perimeter housing seat (not illustrated) configured to house the traction cable 43 and rotates idle dragged by the traction cable 43.

The traction cable 43 is preferably a cable made of steel. The drive pulley 41 and the return pulley 42 are preferably rubber-coated.

The carriage 19 is provided with a gripping member (not illustrated) configured to hook the carriage 19 to the traction cable 43 and is coupled to the detecting device 4 and to the cleaning device 5.

Preferably, the carriage 19 comprises movement means (not illustrated) configured to move the detecting device 4 and/or the cleaning device 5 or a portion of the carriage 19 coupled to the detecting device 4 and/or to the cleaning device 5 towards the band 2, so as to vary the distance between band 2 and detecting device 4.

In the non-limiting example described and illustrated here, the carriage 19 is further provided with a jointed grommet element (not illustrated in the attached figures), configured to house the water supply duct of the detecting device 4 and/or of the cleaning device and if necessary other service cables.

It is understood that the moving device 20 can be of different type, for example pneumatic or hydraulic.

The control device 6 is configured to regulate the cleaning device 5 based on the parameter indicative of the cleaning of the band 2 detected by the detecting device 4.

The control device 6 is preferably arranged in a remote seat and communicates with the cleaning device 5, with the control unit of the detecting device 4 and with the moving assembly 7 and the moving assembly 8 by means of cable or by means of wireless communication systems.

A variation provides for the control device to be coupled to the cleaning device 5 and/or to the detecting device 4.

Figure 4:
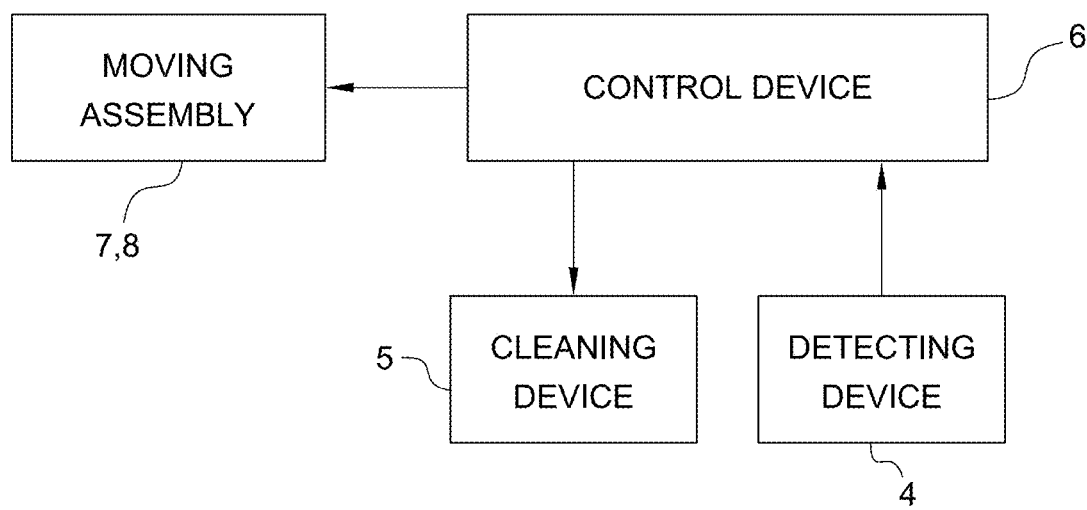
FIG. 4 is a block diagram of the cleaning system in accordance with the present invention.

With reference to FIG. 4, the control device 6 is configured to receive the data detected by the detecting device 4 indicative of the cleaning of the band 2 (in the non-limiting example described here, the permeability values in different points along a direction transversal to the circulation direction S1) and regulate operation of the cleaning device 5 based on said data detected.

In particular, the control device 6 is configured to identify the dirty areas of the band 2, for example by identifying the areas of the band 2 in which the permeability value is lower than a threshold value.

Preferably, the threshold value is calculated by the control device 6 as the mean of the permeability values detected by the detecting device 4 in a given time window.

Figure 8:
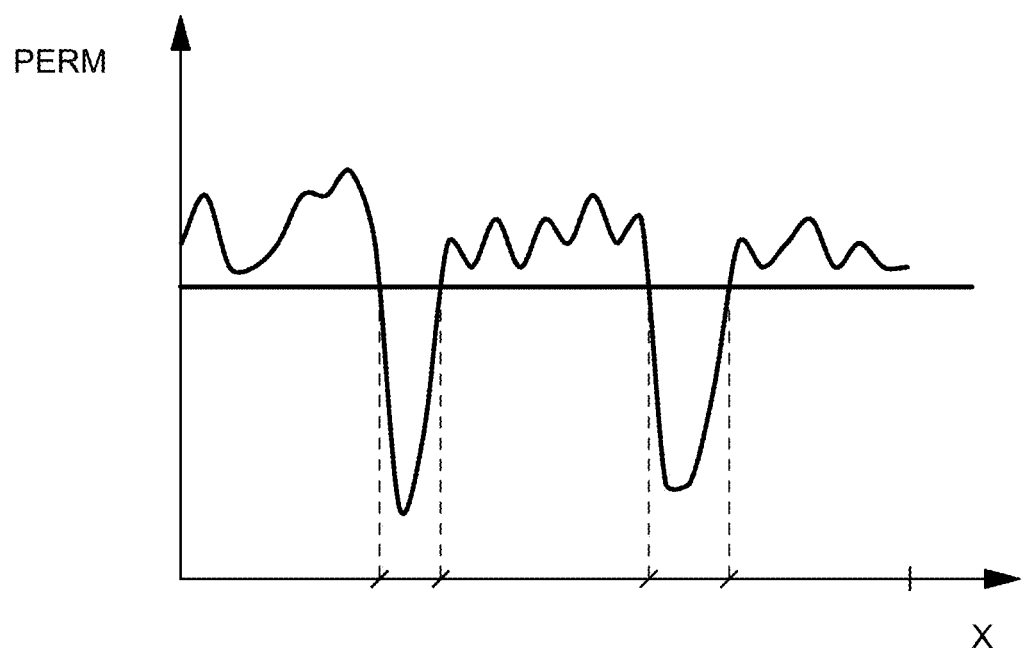
FIG. 8 is a graph indicative of the permeability values detected along the band.

The graph of FIG. 8 illustrates an example of identification of the dirty areas of the band 2.

The X axis shows the dimension of the band X transversal to the circulation direction S1.

The Y axis shows the permeability values detected by the detecting device 4 along the dimension X of the band 2.

The dirty areas Z1, Z2 are those in which the permeability value is lower than the threshold value.

Preferably, the control device 6 is configured to regulate activation of the cleaning device 5 and the position of the cleaning device 5 along the direction transversal to the circulation direction S1 of the band 2.

In particular, the control device 6 is configured to regulate the moving assembly 8 so as to regulate the position of the cleaning device 5 with respect to the band 2.

In other words, the control device 6 regulates the moving assembly 8 so that the cleaning device 5 is positioned and is activated in the dirty areas Z1, Z2 of the band 2 identified by the control device 6.

The control device 6 is preferably configured also to regulate the movement speed of the cleaning device 5 in the direction transversal to the circulation direction S1 while the cleaning device 5 is active.

According to a variation not illustrated, the control device 6 is also configured to regulate the distance of the cleaning device 5 from the band 2.

According to a variation not illustrated, the control device 6 is also configured to regulate the pressure of the jet of water generated by the cleaning device 5.

In use, the detecting device 4 carries out a scan of the band 2 and sends the values detected to the control device 6. Based on said values, the control device 6 regulates the cleaning device 5 as described above.

A variation provides for the detection and cleaning to be substantially carried out in sequence in the direction transversal to the circulation direction S1. In other words, at each position X along the direction transversal to the circulation direction S1 a detection is carried out by the detecting device 4 and any consequent cleaning action by the cleaning device 5.

As already anticipated, FIG. 5 illustrates a variation of the present invention in which the cleaning device 5 and the detecting device 4 are moved independently by the respective moving assemblies (of which only the guide 18 is visible) and are arranged on opposite sides with respect to the guide 18.

FIG. 6 instead illustrates a further variation of the present invention in which the cleaning device 5 and the detecting device 4 are moved independently by the respective moving assemblies (of which only the guide 18 is visible) and are arranged on the same side with respect to the guide 18. The guides 18 of each moving assembly 7 and 8 can be arranged at different heights with respect to the band 2 to allow free and independent sliding in the direction transversal to the circulation direction S1.

In the case of the variation of FIG. 7, the control device 6 is configured to regulate the selective activation of the nozzles 9*a* based on the plurality of parameters indicative of the cleaning of the band 2 detected by the detecting device 4. In other words, the control device 6 activates only the nozzles 9*a* below the dirty areas Z1, Z2.

Lastly it is evident that modifications and variations can be made to the cleaning system and method and to the paper making machine described here without departing from the scope of the attached claims.

The invention claimed is:

1. A cleaning system for cleaning a band (2) circulating in a paper making machine (3); the system (1) comprising:
    at least one detecting device (4) configured to detect at least one parameter indicative of the cleaning conditions of the band (2) on at least one portion of the band (2);
    at least one cleaning device (5) provided with at least one nozzle (9) to create a jet of a cleaning fluid; the nozzle (9) being arranged so that the jet of cleaning fluid is directed towards the band (2);
    a control device (6) configured to regulate the cleaning device (5) on the basis of the at least one parameter indicative of the cleaning conditions of the band (2);
    a first moving assembly (7) configured to move the detecting device (4) along a direction (A) transversal to the circulation direction (S1) of the band (2); the detecting device (4) being active during the movement so as to detect a plurality of parameters indicative of the cleaning conditions of the band (2) in different portions of the band (2);
    wherein the first moving assembly (7) comprises:
        a first moving device (20);
        a first carriage (19) moved by the first moving device (20) and coupled to the detecting device (4);
        a first guide (18) configured to guide the movement of the first carriage (19) and extending along an axis (A) substantially transversal to the circulation direction (S1) of the band (2);
    a second moving assembly (8) configured to move the cleaning device (5) along a direction (A) transversal to the circulation direction (S1) of the band (2), wherein the second moving assembly (8) comprises:
        a second moving device;
        a second carriage moved by the second moving device and coupled to the cleaning device (5); and
        a second guide configured to guide the movement of the carriage and extending along an axis (A) substantially transversal to the circulation direction (S1) of the band (2); and
    a supporting frame (17) supporting the second guide (18); the supporting frame (17) comprising two substantially identical uprights (22) coupled to the second guide (18) and resting on the floor or on an appropriate support base at the sides of the band (2); wherein the second guide (18) and the uprights (22) define a bridge structure.

2. The cleaning system according to claim 1, wherein the detecting device (4) is configured to detect at least one parameter indicative of a permeability of the band (2).

3. The cleaning system according to claim 1, wherein the detecting device (4) is configured to detect a parameter indicative of a humidity of the band (2).

4. The cleaning system according to claim 1, wherein the cleaning device (5) is provided with a plurality of nozzles (9*a*) arranged side-by-side along a direction transversal to the circulation direction (S1) of the band (2); the control device (6) being configured to regulate a selective activation of the nozzles (9*a*) on the basis of the plurality of parameters indicative of the cleaning conditions of the band (2) detected by the detecting device (4).

5. The cleaning system according to claim 1, wherein the first moving assembly (7) and the second moving assembly (8) are independent.

6. The cleaning system according to claim 1, wherein the first moving assembly (7) and the second moving assembly (8) coincide.

7. The cleaning system according to claim 1, wherein the control device (6) is configured to regulate an activation of the cleaning device (5) and the position of the cleaning device (5) along the direction (A) transversal to the circulation direction of the band (S1).

8. The cleaning system according to claim 7, wherein the control device (6) is configured to activate the cleaning device (5) in positions, along the direction (A) transversal to the circulation direction (S1) of the band (2), corresponding to permeability values lower than a threshold value.

9. The cleaning system according to claim 8, wherein the threshold value is a mean value of the plurality of values detected by the detecting device (4) during the movement along the direction (A) transversal to the circulation direction (S1) of the band (2).

10. The cleaning system according to claim 1, wherein the control device (6) is configured to regulate a moving speed of the cleaning device (5) along the direction (A) transversal to the circulation direction (S1) of the band (2) while the cleaning device (5) is active.

11. The cleaning system according to claim 1, wherein the control device (6) is configured to regulate a distance between the cleaning device (5) and the band (2).

12. The cleaning system according to claim 1, wherein the control device (6) is configured to regulate the pressure of the jet of cleaning fluid created by the cleaning device (5).

13. A paper making machine comprising at least one band (2) circulating along a circulation direction (S2) and at least one cleaning system (1) for cleaning a band (2) as claimed in claim 1.

* * * * *